C. ATKINS.
METHOD OF AND MEANS FOR ASSEMBLING CORE LAMINATIONS.
APPLICATION FILED JAN. 19, 1916.
1,375,072.
Patented Apr. 19, 1921.
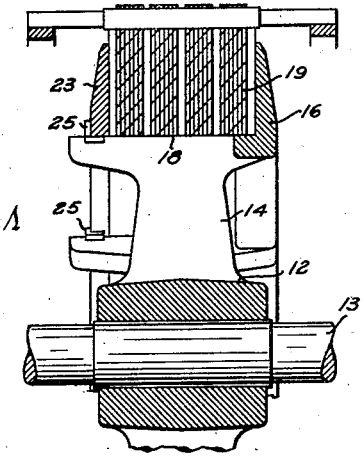
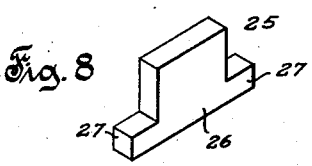
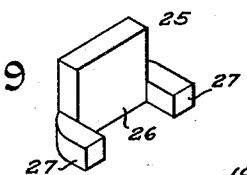
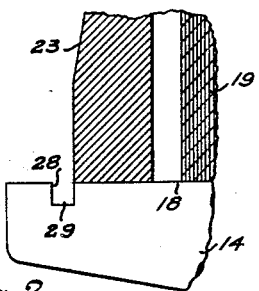
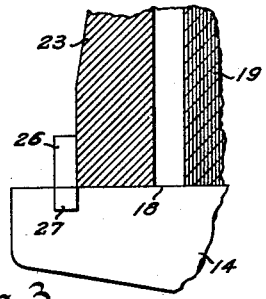
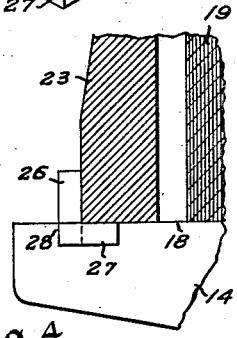
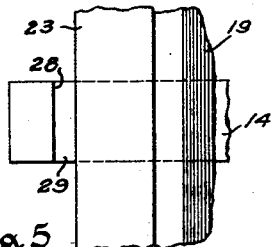
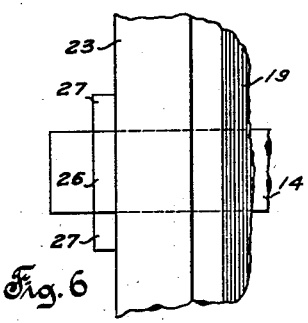
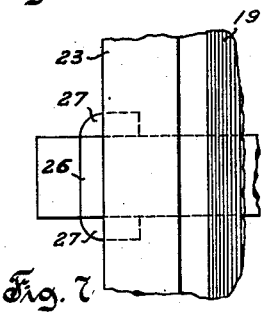
Inventor
C. Atkins
by
Attorney

UNITED STATES PATENT OFFICE.

CHARLES ATKINS, OF CINCINNATI, OHIO, ASSIGNOR TO ALLIS-CHALMERS MANUFACTURING COMPANY, OF MILWAUKEE, WISCONSIN, A CORPORATION OF DELAWARE.

METHOD OF AND MEANS FOR ASSEMBLING CORE LAMINATIONS.

1,375,072.  Specification of Letters Patent.  Patented Apr. 19, 1921.

Application filed January 19, 1916. Serial No. 73,261.

*To all whom it may concern:*

Be it known that I, CHARLES ATKINS, a citizen of the United States, residing at Cincinnati, in the county of Hamilton and State of Ohio, have invented a certain new and useful Improvement in Methods of and Means for Assembling Core Laminations, of which the following is a specification.

This invention relates in general to dynamo electric machines, and has particular relation to methods of assembling core laminations on a support and to devices for securing the laminations in position.

In the construction of dynamo electric machines, it is highly desirable that the core laminations be capable of being expeditiously and effectively secured in position on a supporting element. A disadvantage of known types of devices for securing the laminations in place is that, in assembling the laminations and the securing devices therefor, the laminations are preliminarily compressed to a greater extent than when the parts are in fully assembled condition, the laminations being allowed to expand subsequent to the assembling of the securing or clamping devices which hold the laminations in this condition of incomplete compression. When the laminations are assembled and secured in position in this manner, the core being in a more or less loosely assembled condition, the machine is not capable of the most efficient operation.

It is an object of this invention to provide an improved device for clamping elements or laminations in position on a support which device affords expeditious assembling of the clamped parts and is simple in construction and efficient in operation.

It is a further object of this invention to provide an improved method of assembling and securing the laminations in position on a support.

These and other objects are attained by this invention, the various novel features of which will appear from the description and drawings, disclosing one embodiment of such invention, and will be particularly pointed out in the claims.

In the accompanying drawings:

Figure 1 is a broken sectional elevation along a radial plane of the rotor of a dynamo electric machine embodying this invention.

Figs. 2, 3 and 4 are enlarged broken views similar to Fig. 1, illustrating the method of inserting a clamping element in position.

Figs. 5, 6 and 7 are enlarged broken plan views of the rotor shown in Figs. 1, 2, 3 and 4, and correspond to the showing of Figs. 2, 3 and 4, respectively.

Figs. 8 and 9 are perspective views of a clamping element shown in Figs. 1, 3, 4, 6 and 7, in both its initial and final forms.

In the accompanying drawings, the rotor of a dynamo electric machine, of the squirrel-cage induction motor type, is shown as comprising a spider or support 12 mounted on a shaft 13, the spider arms being designated by the character 14. These spider arms are shown as provided at one side of their radially outer ends with a ring-like connection including an integral radially extending flange 16 which acts as an abutment in assembling the core. The outer ends of the spider arms are machined to form a seat 18 for the core 19. The core is made up of a plurality of laminations pressed together and held in place against the flange or abutment 16 by an end plate 23 which may fit fairly closely on the seat portions 18 at the ends of the spider arms.

The end plate or ring 23 is held in effective clamping position, wherein it acts as an abutment for the laminations which have a tendency to spring apart when in fully assembled condition, by means of a plurality of clamping devices 25 which are of general T-shape, prior to their distortion to effective clamping condition, and comprise a body portion 26 and extensions 27 therefrom along one edge. The seat portions of the spider arms are provided with shouldered portions 28 laterally outside of the position occupied by the end plate 23 when the structure is fully assembled and spaced from the position of the end plate to the extent of the thickness of the body portion 26 of the clamping device. The shouldered portion 28 constitutes an abutment and is preferably provided by forming a substantially circumferentially extending recess 29 in the seat portion of each spider arm 14, the width of the recess being preferably such that the body portion 26 of the clamping device 25 may be received therein with a comparatively close fit. The extensions 27 of the clamping element preferably lie in the same general plane as the body portion 26 when this element is in initial form. These extensions are so disposed relatively to the body portion that the latter portion may be inserted to clamping position between the end plate 23 and the shoulder 28 by radial or circumferential movement, and these extensions can then be bent to a position radially within the end plate and closely adjacent thereto and, preferably, so as to lie closely adjacent to the sides of end portions of the spider arms, as indicated in Figs. 4 and 7.

It will be apparent that, in assembling the laminations and clamping ring, these parts need be pressed toward the flange 16 only until they are in the positions they will occupy finally, at which time the clamping devices 25 may be disposed in operative position with their body portions 26 within the slots or grooves 28 and the projections 27 extending beyond the sides of the end portions of the spider arms. With the parts in these positions, it will be apparent that the end plate 23 and the core laminations are effectively held against expansion or axial movement. The individual clamping devices occupy, at this time, the general positions indicated in Figs. 3 and 6, that is, with the extensions 27 projecting beyond the spider arms. The extensions 27 are then distorted or forced to a position radially within the end plate 23, as indicated in Figs. 1, 4 and 7, wherein the body portions 26 of the clamping devices prevent axial movement of the end plate, while the latter, through its engagement with the projections 27, prevents radial movement of the clamping devices. Again, the bending over of the extensions 27 against the sides of the spider arms prevents circumferential movement of the clamping devices.

While the end plate 23 is shown as being of considerably greater thickness than that of the laminations which make up the core, it will be apparent that this end plate may be of any suitable dimensions and may, in so far as the general features of the invention are concerned, be considered as one of the core laminations.

It will be apparent that, in accordance with the invention disclosed, the laminations of the core may be compressed to the condition which they will retain when the machine is fully assembled; in other words, there need be no final springing apart or separation of the laminations in the assembling and clamping of the same in operative position.

It is to be understood that it is not desired that the invention defined by the claims be limited to the exact details of construction shown and described, for obvious modifications will occur to a person skilled in the art.

It is claimed and desired to secure by Letters Patent:

1. A core for electrical machines comprising a supporting member provided with a circumferential flange adjacent one end and a circumferentially extending groove adjacent the other end, a plate carried by said member and located adjacent said groove, laminæ mounted on said supporting member and held between said flange and said plate, and a clamping device for holding said plate and laminæ against movement away from said flange and comprising a body portion located partially within said groove and bearing against the outer side of said plate, and a portion extending from said body portion toward said plate and beyond the axially outer side of said plate and coöperative with said plate to prevent removal of said clamping device.

2. A core for electrical machines comprising a member provided with a circumferential flange adjacent one end and a circumferential groove adjacent the other end, a clamping plate, laminæ held between said flange and said plate, a clamping device for holding said plate and lamin_ against movement in one direction, said clamping device comprising a body portion located partially within said groove, and a projection from said body portion coöperative with a peripheral surface portion of said plate to retain said clamping device in operative position.

3. In combination, a support provided with a seating surface and an abutment adjacent one edge thereof, core laminæ seated on said support, and means including another abutment for retaining said laminæ in position, said retaining means comprising a body portion bearing against said abutment and the axially outer side of an end one of said laminæ, and a projection from said body portion engaging beneath a peripheral portion of said end lamina to prevent radial displacement of said retaining means.

4. In a dynamo electric machine, a core comprising a plurality of laminæ, a support therefor, said support being provided with an abutment and a groove at a suitable distance from said abutment, and a device for clamping said laminæ against said abutment, said clamping device comprising a body portion fitting closely within said groove, and a projection from said body portion coöperating with an end one of said laminæ to prevent radial displacement of said clamping device.

5. In combination, a support provided with a seating surface, core laminæ seated on said support, an abutment for said laminæ, said support being provided with an axially extending, recessed projection beyond the normal laminæ-occupying portion thereof, a clamping plate, a device for holding said clamping plate against said laminæ and said laminæ in fully assembled condition, said holding device comprising a body portion seated partially within said recess and against which said clamping plate bears, and a projection from said body portion with which a surface of said plate coöperates to retain said holding device in operative position.

6. In a dynamo electric machine, a supporting member provided with a seating surface and spaced axially extending projections, laminæ and an end plate mounted on said seating surface, said projections being provided with substantially circumferential grooves, and devices for clamping said laminæ and end plate in assembled condition, each of said devices comprising a body portion disposed partially within one of said grooves and bearing on said end plate, and a substantially axially extending projection from said body portion with which said end plate coöperates to hold said clamping device in operative position, said axial projection being disposed outside of said grooves.

7. The method of assembling laminæ in position on a support which comprises compressing said laminæ to their fully assembled condition on said support, disposing a clamping device between said compressed laminæ and a shouldered portion of said support to retain said laminæ in fully assembled condition on said support, and distorting a portion of said clamping device to a position wherein an end one of said laminæ coöperates therewith to prevent removal of said clamping device from said support.

8. The method of assembling laminæ in position on a support which comprises compressing said laminæ to their fully assembled condition against a flange on said support, disposing a clamping device partially in a recess in said support to retain said laminæ in fully assembled condition on said support, and distorting a portion of said clamping device to a position beneath one of said laminæ to prevent removal of said clamping device from said support.

9. The method of assembling laminæ in position on a support which comprises compressing said laminæ to their fully assembled condition on said support, disposing clamping devices against shouldered portions of circumferentially spaced portions of said support to retain said laminæ in fully assembled condition on said support, distorting portions of said clamping devices to positions wherein one of said laminæ coöperates therewith to prevent removal of said clamping devices from said support.

10. The method of assembling laminæ in position on a support which comprises compressing said laminæ to fully assembled condition between end plates on said support, disposing clamping devices in recesses in circumferentially spaced portions of said support and in engagement with one of said plates to retain said laminæ in fully assembled condition on said support, and distorting portions of said clamping devices to positions wherein said latter end plate coöperates with said clamping devices to prevent removal thereof from said support.

11. The method of assembling laminæ on a rotor having a supporting spider with a circumferential groove in the outer peripheral surface of one or more arms of the spider, which consists in compressing said laminæ to fully assembled condition inserting a clamping device in one of said grooves said clamping device having portions extending out of said groove in substantially radial and circumferential directions, and then bending said circumferentially extending portion in a plane substantially tangential to the periphery of the spider.

12. The method of assembling laminæ on a rotor having a supporting spider with a circumferential groove in the outer peripheral surface of one or more arms of the spider, which consists in compressing said laminæ to fully assembled condition inserting a clamping device in one of said grooves said clamping device having portions extending out of said groove in substantially radial and circumferential directions, and then bending said circumferentially extending portion so that it extends underneath the inner peripheral surface of said laminæ.

13. In a dynamo electric machine, a rotor comprising laminæ and a supporting spider with a circumferential groove in the outer peripheral surface of one or more of the arms of said spider, a clamping device for said laminæ having a portion seated in one of said grooves, a portion extending radially, and a portion extending alongside of a radial surface of one of said arms.

14. In a dynamo electric machine, a rotor comprising laminæ and a supporting spider with a circumferential groove in the outer peripheral surface of one or more of the arms of said spider, a clamping device for said laminæ having a portion seated in one of said grooves, a portion extending radially and a portion extending substantially parallel to the axis of said rotor alongside of a radial surface of one of said arms.

In testimony whereof, the signature of the inventor is affixed hereto.

CHARLES ATKINS.